United States Patent

[11] 3,623,819

[72] Inventors Erwin Pfaffenberger;
 Hans Forsterling, both of Erlangen, Germany
[21] Appl. No. 870,961
[22] Filed July 22, 1969
[45] Patented Nov. 30, 1971
[73] Assignee P. Gossen & Co. GmbH
 Erlangen, Germany
 Original application Apr. 19, 1967, Ser. No. 631,947. Divided and this application July 22, 1969, Ser. No. 870,961

[54] UNIVERSALLY APPLICABLE PHOTOMETER WITH ADAPTERS FOR REDUCING THE MEASURING ANGLE
2 Claims, 3 Drawing Figs.

[52] U.S. Cl. .................................................. 356/218, 24/230, 356/222, 356/225
[51] Int. Cl. .................................................. G01j 1/42
[50] Field of Search .......................................... 356/218, 222–226, 73; 24/230 AM

[56] References Cited
UNITED STATES PATENTS

| 1,990,361 | 2/1935 | Bailey, Jr. | 356/225 |
| 2,175,027 | 10/1939 | McCune | 356/224 |
| 2,579,661 | 12/1951 | Freund | 356/73 |
| 2,584,440 | 2/1952 | Fogle | 356/224 |
| 2,585,245 | 2/1952 | Harrison | 356/73 |
| 2,952,184 | 9/1960 | Bakke et al. | 356/222 X |
| 2,995,975 | 8/1961 | Balchunas et al. | 356/222 X |
| 3,114,283 | 12/1963 | Gruner | 356/225 X |
| 3,212,394 | 10/1965 | Norwood | 356/222 |
| 3,237,264 | 3/1966 | Turolla | 24/230 AM |
| 3,360,656 | 12/1967 | Kinnard | 356/73 X |
| 3,421,821 | 1/1969 | Alessi | 356/186 |

OTHER REFERENCES
Gossen, P.S.A. Journal, Dec 1966, pp. 10- 11.

*Primary Examiner*—Ronald L. Wibert
*Assistant Examiner*—Warren A. Sklar
*Attorney*—Nolte and Nolte ABSTRACT: The present disclosure relates to a universally applicable light-measuring device, especially photometer, which comprises a main measuring device, e.g. an exposure meter, and easily exchangeable auxiliary measuring devices or adapters for reducing the measuring angle which, when individaully attached to the main measuring device, form therewith new unitary devices, as to outer appearance and function. All adapters have identical bottom portions with two hooklike extensions to be received in corresponding recesses in the main measuring device. One of the extensions is resiliently journaled and may be displaced by a pushbutton for disconnecting the adapter from the main device.

PATENTED NOV 30 1971 3,623,819

INVENTORS
ERWIN PFAFFENBERGER
HANS FÖSTERLING
BY
Nolte & Nolte
ATTORNEYS

UNIVERSALLY APPLICABLE PHOTOMETER WITH ADAPTERS FOR REDUCING THE MEASURING ANGLE

This application is a division of application, Ser. No. 631,947, filed Apr. 19, 1967.

SUMMARY OF THE INVENTION

The present invention relates to a universally applicable photometer, especially for carrying out phototechnical measurements. It comprises a main measuring device and a plurality of measuring angle adapters, which can be connected to the main or basic device by identical means in such a way that a new and unitary device as to appearance and function is created while permitting easy exchange. The main device by itself or in combination with the various adapters may be used to carry out a number of different photometric measurements.

In order to solve the problems involved as to appearance and function, it was necessary to design the adapters to be combined with the main device so that upon assembly a unitary device is produced. To this end all adapters are provided with the same connecting device or arrangement which permits exchange in a very simple manner. The connecting device is not apparent at the main or basic device since the latter is to be used also without the adapters. In addition, care had to be taken that a diffusor which is nondetachably but displaceably connected to the main device, is located outside the path of the rays, to be measured during use of the adapters, bodily and functionally. Moreover, the individual elements of the combination have to be adapted to the physical properties of the main device, which operates as an exposure meter.

It is an object of the present invention to provide a composite light-measuring device, especially a photometer, which is universally applicable for carrying out a large number of photometric measurements.

It is another object of the present invention to provide a light-measuring device as set forth above which comprises a main measuring device and devices which can easily be connected to and detached from the main measuring device.

Still another object consists in the provision of cooperating means for connecting the auxiliary measuring devices, one at a time, to the main measuring device.

According to still another object of this invention, novel auxiliary measuring devices or adapters are proposed for reducing the measuring angle of an objective.

The present invention is illustrated by way of example in the following drawings, in which.

Figure 1:
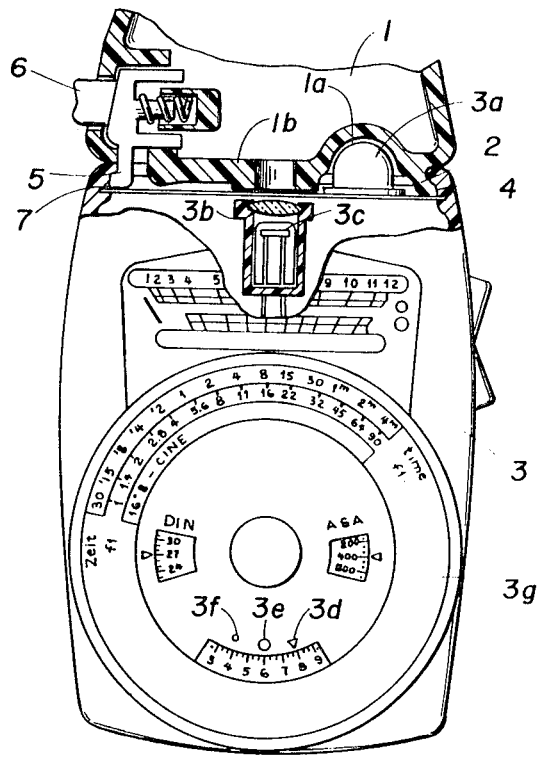
FIG. 1 is a top view, partly in section, of an exposure meter with an adapter.

For connection to the main measuring device 3, all adapters 1 have an identical bottom 1a, 1b with a stationary hooklike extension 2 and a resilient movable nose portion 5 adapted respectively to engage recesses 4, 7 at the top of the exposure meter. The resilient nose portion 5 may be depressed by a key 6 accessible from the outside and, therefore, permits a fast exchange. Furthermore, a recess for the above-mentioned diffusor is provided which, upon attachment of an adapter is displaced in such a way that it occupies a position in this recess.

The connecting device proper, according to FIG. 1, comprises an extension 2 in the form of a hook and arranged at the bottom 1b of housing 1 of the adapter. Extension 2 slides into a recess 4 at the top of the main device 3 when the adapter is attached to the latter. A resilient nose 5 with a key 6 adapted to be actuated by hand from the outside is arranged opposite extension 2. Nose 5 is resiliently held in housing 1 of the adapter and is caught in a second recess 7 of main device 3. In this way, the main device and the adapter are fixedly connected to each other. For purposes of disconnecting the adapter from the main device, key 6 is depressed whereby the adapter may easily be detached. Prior to the connection of the adapters to the main device the diffuser 3a is slidably displaced so that it is located below the depression 1a of the adapter and is received therein.

The main device 3 proper, i.e., the exposure meter in the embodiment shown, has the customary measuring angle of approximately 30°, in other words, is somewhat smaller than the picture angle of an objective of normal focal distance. In order to be able to measure with smaller measuring angles which correspond to the picture angles of ordinary teleobjectives, as, for instance, with an angle of 15° or 7.5° the path of the rays has to be reduced to the desired value by means of an adapter and a variable aperture of a diaphragm.

The structure of this adapter for reducing the measuring angle has to be such that a compact unit and light losses as small as possible are obtained. The optical structure comprises three parts, viz two convex or collecting lenses 13, 15 and a variable or adjustable diaphragm 16 which is arranged between the two lenses close to the lens on the exit side. As an optimum solution, the lens 13 on the entrance side is so designed that it produces an image of the distant objects in the plane of the diaphragm 16. The focal distance $f_1$ of this lens and the aperture of the diaphragm with the radius $a$ are so dimensioned that the desired acceptance angle satisfies the condition:

$$\tan\alpha = a/f_1$$

The focal distance of the lens 15 on the exit side is so selected that the opening or aperture of the lens on the entrance side appears on a reduced scale on a photoconductive cell or photoresistance of the main or basic measuring device. This image is produced, according to FIG. 1, with the cooperation of the lens 3b on the entrance side of the main device, which receives this image from lens 15 of the installed adapter via conventional light path means, not shown. The variable diaphragm is formed by a slide 16 with two different size diaphragm apertures, one of which appears in the drawing. Furthermore, an optical viewfinder 10, 12, 14 is incorporated in the housing of the measuring angle reducing adapter, since it is very difficult without this aid to sight the object to be measured accurately when small measuring angles are involved.

Figure 2:
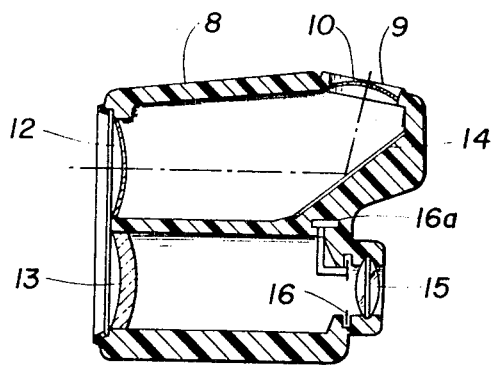
FIG. 2 is a cross section of an adapter for reducing the measuring angle of the exposure meter, and taken along the line 2—2 of FIG. 3.
Figure 3:
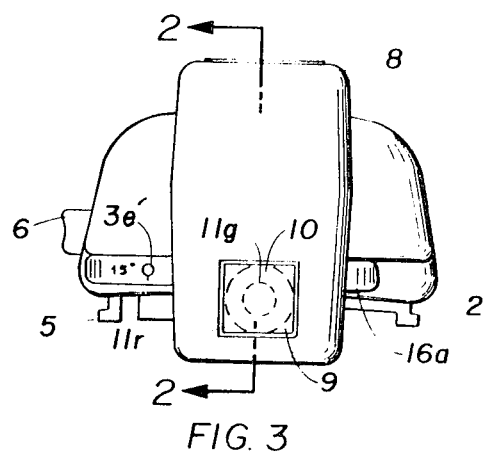
FIG. 3 is a top view of the adapter of FIG. 2.

The just-mentioned adapter for reducing the measuring angle. It comprises a housing 8 with a viewing opening 9 for the viewfinder, which is covered by a small glass plate 10. Two annular, colored grooves 11r and 11g are ground into this plate and indicate in the viewfinder the limits of the respective measuring angle in color (red and green). Two lenses 12 and 13 are arranged on that side which faces the object being measured. Lens 12 in combination with a deviating mirror 14 serves as finder and produces images of distant objects on the small glass plate 10, whereas lens 13 and lens 15, in combination with disc diaphragm 16 arranged adjacent lens 15, serve as actual measuring angle limiting means. Diaphragm 16 has two apertures corresponding to the measuring angles 15° and 7.5° and is adjustable from the outside by means of a slide 16a diagrammatically illustrated in FIGS. 2 and 3. When reading the exposure values on the main device and when adjusting the calculating ring 3g according to FIG. 1, a reading mark 3e or 3f which is offset with regard to the main reading mark 3d is to be used because of the light loss in view of the reduction of the measuring angle to 15° and 7.5° respectively. The symbols corresponding to these marks are also shown on slide 16a and one of them (3e') is visible in the corresponding position of the latter (see FIG. 3). It is, of course, to be understood that instead of the two measuring angles of 15° and 7.5°, selected by way of example also three or more angles with different values may be accommodated in the diaphragm 16.

While in some of the Figures of the drawing the adapters have been shown by themselves, it is to be understood that each of them has to be connected to the main measuring device 3 as shown in FIG. 1 to form therewith a complete, operable unit.

Although the invention has been described with reference to specific embodiments thereof, it is not intended to limit the invention to such specific embodiments alone, but it should be interpreted in the scope of the appended claims.

What is claimed is:

1. A light-measuring device especially for phototechnical measurements, comprising main measuring means having a measuring angle at which light may enter the main measuring means; auxiliary measuring means having a light entrance side and a light exit side; means on the auxiliary measuring means to interconnect it with the main measuring means so as to form a unitary device; and a system in the auxiliary measuring means for reducing the measuring angle of said main measuring means, said system comprising a first lens on the light entrance side and a second lens on the light exit side thereof; a movable diaphragm, said first lens producing an image of objects being measured, in the plane of said diaphragm; a light inlet lens and a photoresistance in said main measuring means,; the focal distance of said second lens being such that the latter, in combination with said light inlet lens, produces a reduced image of the opening of said first lens on said photoresistance.

2. A light measuring device as claimed in claim 1, which includes: an optical viewfinder in said auxiliary measuring device, and transparent plate means in said viewfinder with annular colored grooves provided therein.

* * * * *